US012640070B2

(12) United States Patent
Lee et al.

(10) Patent No.: US 12,640,070 B2
(45) Date of Patent: May 26, 2026

(54) ELECTRONIC DEVICE, AND METHOD FOR CONTROLLING BRIGHTNESS OF DISPLAY IN ELECTRONIC DEVICE

(71) Applicant: SAMSUNG ELECTRONICS CO., LTD., Suwon-si (KR)

(72) Inventors: Jinbae Lee, Suwon-si (KR); Kihong Min, Suwon-si (KR); Heewoong Yoon, Suwon-si (KR); Hyungpil Kum, Suwon-si (KR); Donghwan Seo, Suwon-si (KR); Hyeonchang Son, Suwon-si (KR); Kyeongmun Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/818,103

(22) Filed: Aug. 28, 2024

(65) Prior Publication Data

US 2024/0420609 A1 Dec. 19, 2024

Related U.S. Application Data

(63) Continuation of application No. PCT/KR2022/020486, filed on Dec. 15, 2022.

(51) Int. Cl.
*G09G 3/00* (2006.01)
*H04N 23/745* (2023.01)

(52) U.S. Cl.
CPC ........... *G09G 3/035* (2020.08); *H04N 23/745* (2023.01); *G09G 2320/0626* (2013.01); *G09G 2360/144* (2013.01)

(58) Field of Classification Search
CPC ........... G09G 3/035; G09G 2320/0626; G09G 2360/144; G09G 3/20; G09G 5/10; H04N 23/745
See application file for complete search history.

(56) References Cited

U.S. PATENT DOCUMENTS 8,996,072 B2 3/2015 Li
9,508,318 B2 11/2016 Pieper et al.
(Continued)

FOREIGN PATENT DOCUMENTS

EP 3 298 762 B1 4/2023
JP 2020-129756 A 8/2020
(Continued)

OTHER PUBLICATIONS

European Extended Search Report issued Sep. 18, 2024 by the European Patent Office for EP Patent Application No. 22854499.5.
(Continued)

*Primary Examiner* — Benyam Ketema
(74) *Attorney, Agent, or Firm* — Sughrue Mion, PLLC

(57) ABSTRACT

An electronic device according to various embodiments comprises: a display; a camera module; a sensor module including a first sensor, which is disposed on the rear part of the electronic device and operates on the basis of light, and a second sensor, which is disposed on the front part of the electronic device and operates on the basis of light; and a processor including a first processor and a second processor, wherein the processor can be configured to control the brightness of the display on the basis of data received from the first sensor and data received from the second sensor when the camera module is in an inactive state, and control the brightness of the display on the basis of data received from the second sensor, and not on the basis of data received from the first sensor, when the camera module is in an active state.

16 Claims, 9 Drawing Sheets

(56) References Cited

U.S. PATENT DOCUMENTS

| | | | | |
|---|---|---|---|---|
| 10,684,164 B2 * | 6/2020 | Kang | .................... | G01J 1/4228 |
| 10,817,018 B1 | 10/2020 | Shao et al. | | |
| 11,125,610 B2 * | 9/2021 | Yoon | .................... | G01J 1/4204 |
| 11,425,337 B2 | 8/2022 | Murao et al. | | |
| 11,514,872 B2 | 11/2022 | Yang et al. | | |
| 12,001,244 B2 | 6/2024 | Cho et al. | | |
| 12,022,189 B2 | 6/2024 | Jung et al. | | |
| 2008/0303918 A1 * | 12/2008 | Keithley | ................. | G09G 3/20 |
| | | | | 348/223.1 |
| 2014/0009639 A1 * | 1/2014 | Lee | ......................... | G03B 7/08 |
| | | | | 348/229.1 |
| 2014/0092119 A1 | 4/2014 | Jung et al. | | |
| 2016/0372053 A1 * | 12/2016 | Lee | ........................ | G09G 3/342 |
| 2017/0034494 A1 * | 2/2017 | Kang | .................... | H04N 23/88 |
| 2018/0061313 A1 * | 3/2018 | Jang | ...................... | G06F 1/1643 |
| 2018/0218710 A1 * | 8/2018 | Park | ......................... | G09G 5/00 |
| 2020/0022239 A1 | 1/2020 | Hung et al. | | |
| 2020/0242985 A1 | 7/2020 | Cho et al. | | |
| 2020/0265799 A1 * | 8/2020 | Choi | .................... | G06F 1/1652 |
| 2021/0248942 A1 * | 8/2021 | Yoon | ......................... | G01J 1/32 |
| 2022/0086409 A1 * | 3/2022 | Park | ........................ | G01J 3/524 |
| 2022/0114956 A1 * | 4/2022 | Lee | .......................... | G09G 5/00 |
| 2022/0321754 A1 * | 10/2022 | Moon | .................... | H04N 23/71 |
| 2022/0368786 A1 * | 11/2022 | Kim | ...................... | G06F 1/1647 |
| 2024/0386716 A1 * | 11/2024 | Lettiere | ................. | G06F 3/0488 |
| 2024/0420609 A1 * | 12/2024 | Lee | ........................ | G09G 3/20 |

FOREIGN PATENT DOCUMENTS

| | | |
|---|---|---|
| KR | 10-2009-0081138 A | 7/2009 |
| KR | 10-2014-0007518 A | 1/2014 |
| KR | 10-2014-0042578 A | 4/2014 |
| KR | 10-2016-0149968 A | 12/2016 |
| KR | 10-2017-0102655 A | 9/2017 |
| KR | 10-2021-0084016 A | 7/2021 |
| KR | 10-2280603 B1 | 7/2021 |
| KR | 10-2022-0015712 A | 2/2022 |
| KR | 10-2022-0017109 A | 2/2022 |
| WO | 2021/076276 A1 | 4/2021 |

OTHER PUBLICATIONS

International Search Report (PCT/ISA/210) issued Mar. 24, 2023 by the International Searching Authority in the International Patent Application No. PCT/KR2022/020486.

Written Opinion (PCT/ISA/237) issued Mar. 24, 2023 by the International Searching Authority in the International Patent Application No. PCT/KR2022/020486.

* cited by examiner

ELECTRONIC DEVICE, AND METHOD FOR CONTROLLING BRIGHTNESS OF DISPLAY IN ELECTRONIC DEVICE

CROSS-REFERENCE TO RELATED APPLICATION(S)

This application is a continuation of International Application No. PCT/KR2022/020486 designating the United States, filed on Dec. 15, 2022, in the Korean Intellectual Property Receiving Office and claiming priority to Korean Patent Application Nos. 10-2022-0025726, filed on Feb. 28, 2022, and 10-2022-0051819, filed on Apr. 27, 2022, in the Korean Intellectual Property Office, the disclosures of each of which are incorporated by reference herein in their entireties.

TECHNICAL FIELD

Various embodiments relate to an electronic device and a method for adjusting the brightness of a display in an electronic device.

Background Art

Advancing information communication technologies and semiconductor technologies accelerate the spread and use of various electronic devices. In particular, recent electronic devices may perform communication while being carried and may include one or more sensors for obtaining various types of ambient information. A sensor in an electronic device may obtain various pieces of information. There may be a diversity of types of sensors depending on information to be obtained.

Among the sensors of the electronic device, a camera sensor, an ultra violet (UV) sensor, an iris sensor, a spectroscopic sensor, an infrared (IR) (proximity/gesture) sensor, an RGB sensor, an illuminance sensor (or an ambient light sensor or an ALS sensor), and/or a flicker sensor uses light.

An electronic device may adjust the brightness of the display by measuring the illuminance of the ambient light source by an illuminance sensor disposed on the front surface thereof.

However, when an electronic device changes its position, e.g., a change in the folding angle of a foldable-type electronic device or lying or leaning of a bar-type electronic device, the illuminance of the ambient light source in the field of view (FOV) of the illuminance sensor disposed on the front surface of the electronic device may not be measured.

In particular, as the angle between the illuminance sensor disposed on the front surface of the electronic device and the ambient light source increases due to a change in the folding angle or position of the electronic device, the illustrating of the light source in the field of view (FOV) of the illuminance sensor may not be measured, so that the brightness of the display may be changed to be dark regardless of the ambient brightness.

Various embodiments relate to a method for adjusting the brightness of a display in an electronic device.

Summary

According to various embodiments, an electronic device may comprise a display, a camera module, a sensor module including a first sensor disposed on a rear surface of the electronic device and operated based on light and a second sensor disposed on a front surface of the electronic device and operated based on light, and a processor including a first processor and a second processor. The processor may be configured to adjust a brightness of the display based on data received from the first sensor and data received from the second sensor when the camera module is in an inactive state, and adjust the brightness of the display based on data received from the second sensor and not based on data received from the first sensor when the camera module is in an active state.

According to various embodiments, a method for adjusting a brightness of a display in an electronic device may comprise adjusting the brightness of the display of the electronic device, based on data received from a first sensor disposed on a rear surface of the electronic device and operated based on light and data received from a second sensor disposed on a front surface of the electronic device and operated based on light when a camera module of the electronic device is in an inactive state, by a processor of the electronic device and adjusting the brightness of the display based on data received from the second sensor and not based on data received from the first sensor when the camera module is in an active state.

According to various embodiments, it is possible to properly adjust the brightness of the display with less power consumption even when the ambient light source is not detected in the field of view (FOV) of the illuminance sensor disposed on the front surface of the electronic device due to a change in the folding angle or position of the electronic device.

DETAILED DESCRIPTION

Figure 1:
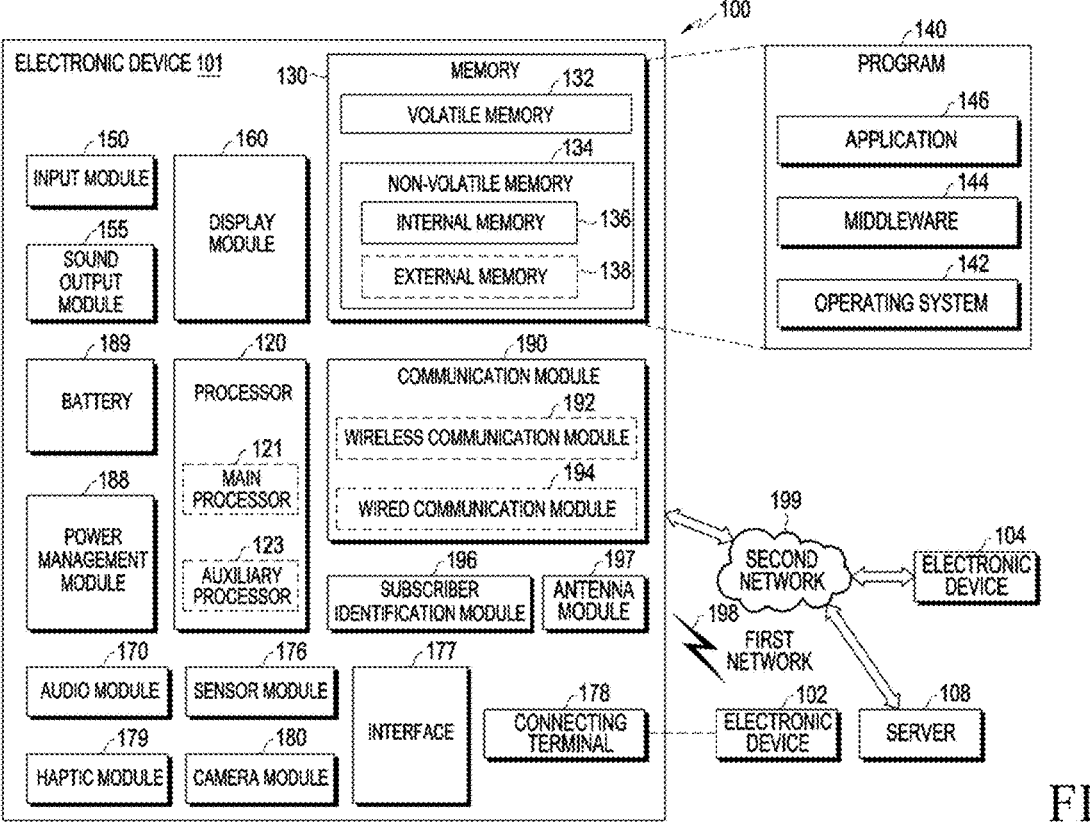
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
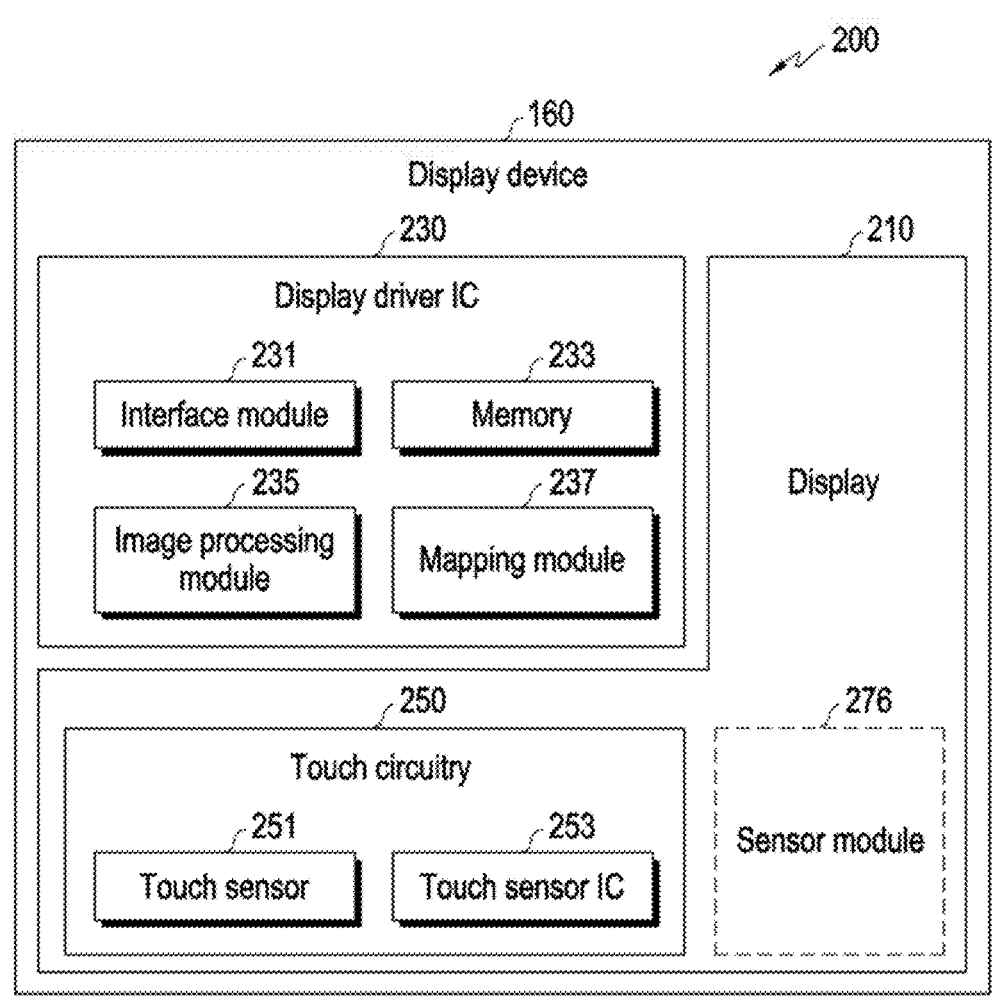
FIG. 2 is a block diagram illustrating a display device according to various embodiments.

FIG. 2 is a block diagram 200 illustrating a display module 160 according to various embodiments.

Referring to FIG. 2, the display module 160 may include a display 210 and a display driver integrated circuit (DDI) 230 to control the display 110. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 276 (e.g., the sensor module 176 of FIG. 1) via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor (e.g., the processor 120 of FIG. 1). According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 276 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display module 160 includes a pressure sensor, the pressure sensor may obtain pressure information corresponding to a touch input received via a partial or whole area of the display 210. According to an embodiment, the touch sensor 251 or the sensor module 276 may be disposed between pixels in a pixel layer of the display 210, or over or under the pixel layer.

Figure 3:
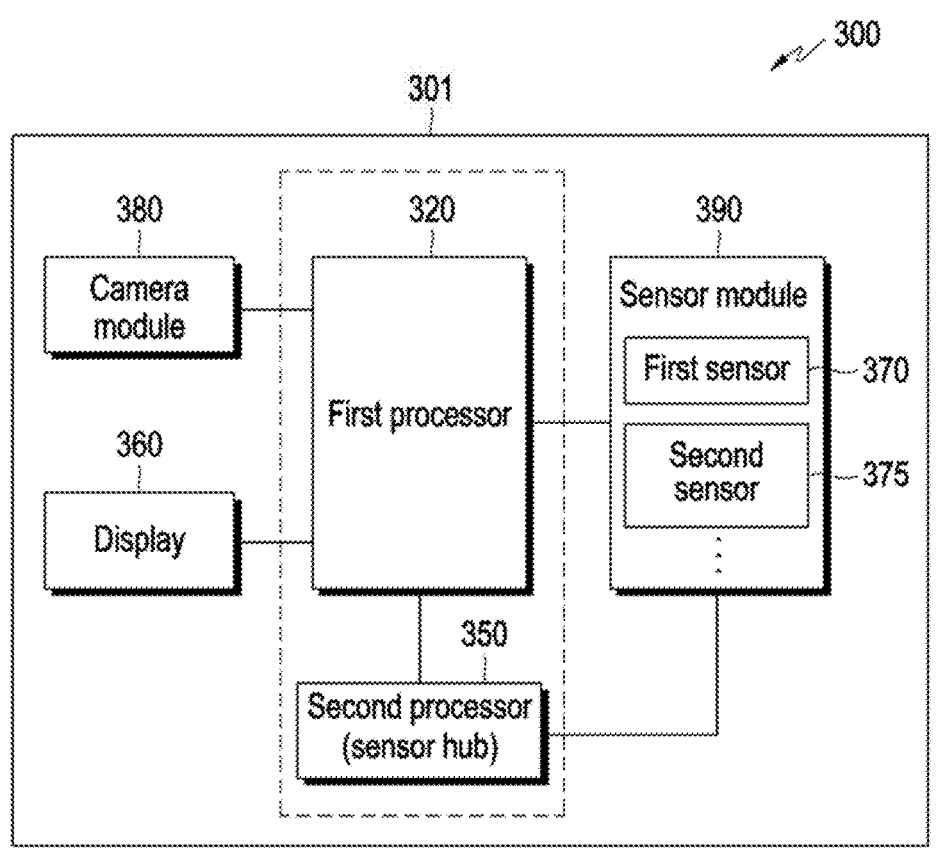
FIG. 3 is a block diagram illustrating an electronic device according to various embodiments.

FIG. 3 is a block diagram 300 illustrating an electronic device according to an example embodiment.

Referring to FIG. 3, according to various embodiments, an electronic device 301 (e.g., the electronic device 101 of FIG. 1) may include a first processor 320, a second processor 350, a sensor module 390, a camera module 380, and a display 360.

According to various embodiments, the electronic device 301 may include a processor (e.g., the processor 120 of FIG. 1). The processor may include a first processor 320 indicating a main processor (e.g., the main processor 121 of FIG. 1) (e.g., a central processing unit or an application processor) and a second processor 350 indicating an auxiliary processor (e.g., the auxiliary processor 123 of FIG. 1) (e.g., a sensor hub) operated independently from or together with the first processor 320.

According to various embodiments, the electronic device 301 may separately include the first processor 320 indicating a main processor (e.g., the main processor 121 of FIG. 1) (e.g., a central processing unit or an application processor) and the second processor 350 (e.g., a sensor hub) indicating an auxiliary processor (e.g., the auxiliary processor 123 of FIG. 1).

According to various embodiments, the first processor 320 may remove flicker noise (or band noise) from an image obtained by the camera module 380 based on data (e.g., raw data or light source frequency) received from a first sensor 370 included in the sensor module 390 if the camera module 380 is activated.

According to an embodiment, the first processor 320 may transmit an activation signal of the camera module to the first sensor 370 to activate the camera module 380 by executing a camera application and activate a first block (e.g., b1 of FIG. 4) for detecting flicker in the first sensor 370.

According to an embodiment, the first processor 320 may detect the frequency of the source of 100 Hz or 120 Hz with flicker noise based on the data received from the first sensor 370, removing the flicker noise (or band noise) to be generated from the image obtained from the camera module 380.

According to various embodiments, a second processor 350 may include a micro controller unit (MCU) that may compute and process the data received from a plurality of sensors included in the sensor module 390 with less power consumption.

According to an embodiment, the second processor 350 may process the data received from the plurality of sensors, which remain active and in operation with less power consumption.

According to various embodiments, the second processor 350 may control the brightness of the display 360 based on the data (e.g., digital raw data) received from at least one of the first sensor 370, which may be operated based on light, and a second sensor 375, which may be operated based on light, among the sensors included in the sensor module 390, based on the active or inactive state of the camera module 380.

According to an embodiment, when the camera module 380 is in the inactive state, the second processor 350 may compare data (e.g., digital raw data) received from a first sensor 370 disposed on the rear surface of the electronic device 301 with data (e.g., digital raw data, or uncalibrated digital raw data) received from a second sensor 375 disposed on the front surface of the electronic device 301. If the result of the comparison reveals that the data received from the first sensor 370 has a larger raw value than the data received from the second sensor 375, the second processor 350 may compute the data received from the first sensor 370 as an illuminance value and adjust the brightness of the display 360 based on the computed illuminance value. If the result of the comparison reveals that the data received from the second sensor 375 has a larger raw value than the data received from the first sensor 370, the second processor 350 may compute the data received from the second sensor 375 as an illuminance value and adjust the brightness of the display 360 based on the computed illuminance value.

According to an embodiment, when the camera module 380 is in the active state, the second processor 350 may compute the data received from the second sensor 375 disposed on the front surface of the electronic device as an illuminance value and control the brightness of the display 360 based on the computed illuminance value.

According to an embodiment, when the camera module 380 is in the inactive state, the second processor 350 may compare the data (e.g., the digital raw data) received from the first sensor 370 disposed on the rear surface of the electronic device 301 with the data (e.g., digital raw data) received from the second sensor 375 disposed on the front surface of the electronic device 301 and may control the brightness of the display using the illuminance value computed with the data received from the first sensor 370 or the illuminance value computed with the data received from the second sensor 375 based on the result of the comparison, the operation of controlling the brightness may also be performed by the first processor 320 in the same manner.

According to various embodiments, the electronic device may be a foldable electronic device. The foldable electronic device may include a sensor module 390 including at least one third sensor (e.g., an angle sensor, a tilt sensor, and/or an accelerometer) capable of detecting the position of the electronic device. Upon detecting a folding state (e.g., opened state, closed state, or intermediate state) of the foldable electronic device using the third sensor, a second processor 350 may transmit, to the first sensor 370, a signal capable of activating a second block (e.g., b2 of FIG. 4) for detecting ambient light in the first sensor 370 based on the folding state of the foldable electronic device.

According to an embodiment, upon identifying that the folding angle of the foldable electronic device is at least at a reference angle, wherein the folding angle may be determined based on the folding state of the foldable electronic device using the third sensor, the second processor 350 may transmit, to the first sensor 370, a signal capable of activating the second block (e.g., b2 of FIG. 4) for detecting ambient light in first sensor 370.

According to an embodiment, the second processor may detect the folding state of a hinge connecting two housings where a foldable display is disposed using the third sensor and detect the folding angle of the foldable electronic device according to the folding state.

According to an embodiment, the reference angle may denote an angle for determining whether it is possible to measure the illuminance of the ambient light source within the field of view (FOV) of the second sensor 375 disposed on the front surface of the electronic device 301.

According to an embodiment, a reference position (e.g., reference angle) may be determined depending on the type of the second sensor 375 disposed on the front surface of the electronic device 301 and the mounting structure of the second sensor 375.

According to an embodiment, the numbers from Table 1 to 947 to 3191 below represent ADC values and may be values representing brightness at 300 Lux. When the second sensor 375 receives light from a light source, each R, G, B, C channel in the second sensor may respond to light to output R, G, B, and C values expressed as ADCs and ADC of each channel and f (x,y,z) formula. In this case, x, y, and z may represent ADC values of RGB channels. at the same illumination, as shown in Table 1 below, a decrease in data of the second sensor means a decrease in FOV, and ratio may indicate a degree of decrease in data of the second sensor compared to 300 Lux.

According to an embodiment, when the ratio of the data values (e.g., the R value, G value, B value, and/or C value converted into digital values) received from the second sensor 375 is 50% or less, the second processor 350 may determine that it will not, e.g., because it is impossible, measure the illuminance of the ambient light source within the field of view (FOV) of the second sensor 375 disposed on the front surface of the electronic device. Light received in the second sensor 375 may include various colours that may be represented as red (R), green (G), blue (B) and/or Clear (C) values in the data as shown in Table 1 below.

TABLE 1

| angle | upward | ratio | downward | ratio |
|---|---|---|---|---|
| 0 degrees | 3191 | 100% | 3191 | 100% |
| 10 degrees | 3047 | 95% | 3094 | 97% |
| 20 degrees | 2704 | 85% | 2749 | 86% |
| 30 degrees | 2125 | 67% | 2175 | 68% |
| 35 degrees | 1874 | 59% | 1927 | 60% |
| 40 degrees | 1564 | 49% | 1553 | 49% |
| 45 degrees | 1286 | 40% | 1262 | 40% |
| 50 degrees | 1005 | 31% | 947 | 30% |

Table 1 is a non-limiting example and shows the strength of introduced light according to changes in the angle between the direction of a sensor drum and the direction of a light source, e.g., a 300 lux light source. In Table 1, "upward" denotes the illuminance value measured when the electronic device is tilted upward where the light source is located while the rear of the electronic device is located on the floor and the front of the electronic device is facing the light source, and "downward" denotes the illuminance value measured when the electronic device is tilted downward opposite to the position of the light source while the rear of the electronic device is located on the floor and the front of the electronic device is facing the light source.

In Table 1, when a foldable-type electronic device is fully unfolded and faces towards the ambient light source, or a bar-type electronic device faces towards the ambient light source, the angle between the second sensor 375 disposed on the front surface of the electronic device and the ambient light source may be denoted as 0 degrees.

In Table 1, at the zero-degree angle between the second sensor 375 disposed on the front surface of the electronic device and the ambient light source, when the foldable-type electronic device is in a state of in-folding at an angle of 0 degrees (e.g., 10 degrees, 20 degrees, 30 degrees, 35 degrees, 40 degrees, 45 degrees, or 50 degrees) or when the bar-type electronic device is in a state of tilting at an angle of 0 degrees (e.g., 10 degrees, 20 degrees, 30 degrees, 35 degrees, 40 degrees, 45 degrees, or 50 degrees), the angle between the second sensor 375 disposed on the front surface of the electronic device and the ambient light source may be denoted as 0 degrees (e.g., 10 degrees, 20 degrees, 30 degrees, 35 degrees, 40 degrees, 45 degrees, or 50 degrees).

According to various embodiments, the sensor module 390 (e.g., the sensor module 176 of FIG. 1 and/or the sensor module 276 of FIG. 2) may include a plurality of sensors and may include the first sensor 370 disposed on the rear surface of the electronic device 301 and operated based on light and the second sensor 375 disposed on the front surface of the electronic device 301 and operated based on light among the plurality of sensors.

According to various embodiments, the first sensor 370 may transmit, to the first processor 320, data (e.g., raw data or light source frequency) for removing the flicker noise (or band noise) from the image obtained by the camera module when the camera module 380 is in the active state and may transmit, to the second processor 350, data (e.g., digital raw data) for adjusting the brightness of the display 360 when the camera module 380 is in the inactive state.

According to an embodiment, the first sensor 370 may include a flicker sensor.

According to an embodiment, if the first sensor 370 receives an activation signal of the camera module from the first processor 320, the first block (e.g., b1 of FIG. 4) for detecting the flicker included in the first sensor 370 may be activated, and the second block (e.g., b2 of FIG. 4) for detecting ambient light included in the first sensor 370 may be deactivated. For the first processor 320 to remove the flicker noise (or band noise) from the image obtained by the camera module 380, the first sensor 370 may transmit the data obtained by the first sensor 370 through the activated first block (e.g., b1 of FIG. 4) to the first processor 320.

According to an embodiment, while the second block (e.g., b2 of FIG. 4) for detecting ambient light included in the first sensor 370 is active, and the first block (e.g., b1 of FIG. 4) for detecting flicker included in the first sensor 370 is inactive, the first sensor 370 may transmit, to the second processor 350, the data obtained by the first sensor 370 through the activated second block (e.g., b2 of FIG. 4), as illuminance data for adjusting the brightness of the display.

According to an embodiment, when the first sensor 370 receives the activation signal of the camera module from the first processor 320 while the second block (e.g., b2 of FIG. 4) for detecting ambient light included in the first sensor 370 is active and the first block (e.g., b1 of FIG. 4) for detecting flicker included in the first sensor 370 is inactive, the first block (e.g., b1 of FIG. 4) for detecting flicker included in the first sensor 370 may be activated, and the second block (e.g., b2 of FIG. 4) for detecting ambient light included in the first sensor 370 may be deactivated. The data obtained by the first sensor 370 through the first block (e.g., b1 of FIG. 4) may be transmitted to the first processor 320.

Figure 4:
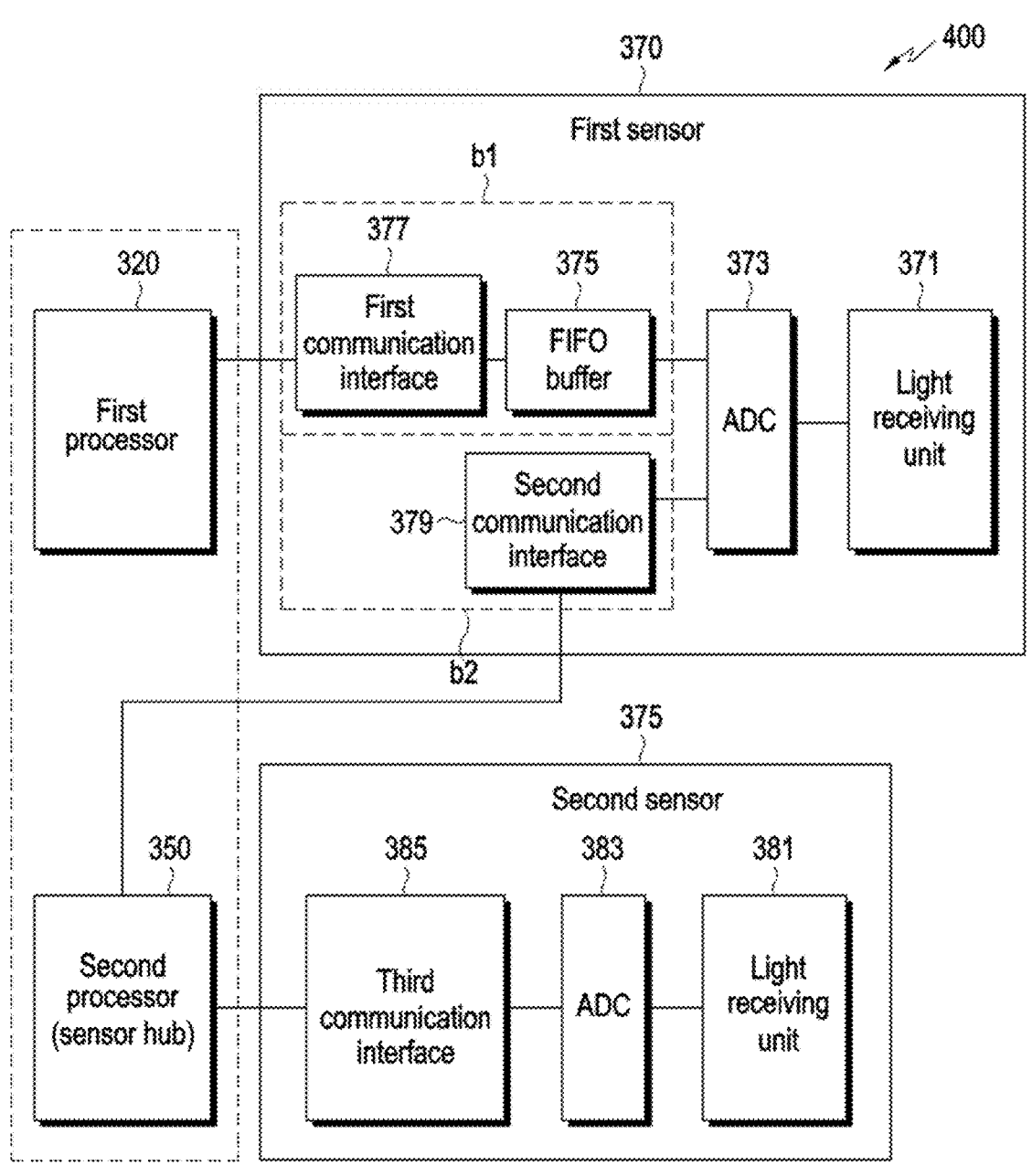
FIG. 4 is a block diagram illustrating a sensor included in an electronic device according to various embodiments.

According to various embodiments, upon receiving a signal for activating the second block (e.g., b2 of FIG. 4) for detecting ambient light included in the first sensor 370, from the second processor 350, the first sensor 370 may activate the second block (e.g., b2 of FIG. 4).

According to an embodiment, if the first sensor 370 receives a signal for activating the second block (e.g., b2 of FIG. 4) for detecting ambient light included in the first sensor 370 from the second processor 350 and does not receive the activation signal of the camera module from the first processor 320 while the second block (e.g., b2 of FIG. 4) for detecting ambient light included in the first sensor 370 is inactive, and the first block (e.g., b1 of FIG. 4) for detecting flicker included in the first sensor 370 is inactive, the first block (e.g., b1 of FIG. 4) for detecting flicker included in the first sensor 370 may be deactivated, and the second block (e.g., b2 of FIG. 4) for detecting ambient light included in the first sensor 370 may be activated. The first sensor 370 may transmit, to the second processor 350, the data obtained by the first sensor 370 through the activated second block (e.g., b2 of FIG. 4), as illuminance data.

According to an embodiment, if the first sensor 370 receives a signal for activating the second block (e.g., b2 of FIG. 4) for detecting ambient light included in the first sensor 370 from the second processor 350 and receives the activation signal of the camera module from the first processor 320 while the second block (e.g., b2 of FIG. 4) for detecting ambient light included in the first sensor 370 is inactive and the first block (e.g., b1 of FIG. 4) for detecting flicker included in the first sensor 370 is inactive, the first block (e.g., b1 of FIG. 4) for detecting flicker included in the first sensor 370 may be activated, and the second block (e.g., b2 of FIG. 4) for detecting ambient light included in the first sensor 370 may be deactivated. For the first processor 320 to remove the flicker noise (or band noise) from the image obtained by the camera module, the first sensor 370 may transmit the data obtained by the first sensor 370 through the activated first block (e.g., b1 of FIG. 4) to the first processor 320.

According to various embodiments, the second sensor 375 may transmit data (e.g., digital raw data) capable of adjusting the brightness of the display 360 to the second processor 350.

According to an embodiment, the second sensor 375 may include an illuminance sensor.

According to various embodiments, the sensor module 390 may include at least one of an angle sensor, a tilt sensor, or an accelerometer capable of detecting a change in the position of the electronic device (e.g., the folding angle and/or posture (or mounting) of the electronic device).

According to various embodiments, the display 360 may be implemented in substantially the same or similar manner to the display module 160 of FIG. 1.

According to an embodiment, the brightness of the display 360 may be adjusted based on the data received from the first sensor 370 and the second sensor 375.

According to various embodiments, the camera module 380 may be implemented in substantially the same or similar manner to the camera module 180 of FIG. 1 and/or the camera module 280 of FIG. 2.

FIG. 4 is an example block diagram 400 illustrating a sensor included in an electronic device according to various embodiments.

Referring to FIG. 4, the first sensor 370 disposed on the rear surface of the electronic device (e.g., the electronic device 101 of FIG. 1 and/or the electronic device 301 of FIG. 3) may include a light receiving unit 371, an analog-to-digital converter (ADC) 373, a first block b1 for detecting flicker, and a second block b2 for detecting ambient light.

According to various embodiments, the first sensor 370 may be disposed in a position adjacent to the rear camera module disposed on the rear surface of the electronic device.

According to various embodiments, the light receiving unit 371 may include a 4×4 16 photodiode array. The analog electrical signal corresponding to each of the red (R) light quantity, green (G) light quantity, blue (B) light quantity, or clear (C) quantity of the light incident through the light receiving unit 371 may be transmitted to the ADC 373. R (red) light quantity, G (green) light quantity, B (blue) light quantity, or C (clear) light quantity may be the intensity of light received from the R channel, the G channel, the B channel, and the C channel, respectively.

According to an embodiment, the light receiving unit 371 may include a plurality of channels, e.g., an R channel, a G channel, a B channel, and a C channel or may also include two channels (e.g., a C channel and an IR channel) capable of receiving visible light and IR-band light. The channels may include a plurality of light receiving elements capable of receiving light. For example, each of the R channel, the G channel, the B channel, and the C channel may include a plurality (e.g., four) photodiodes capable of receiving external light.

According to various embodiments, the ADC 373 may convert the analog electrical signal corresponding to each of the R (red) light quantity, G (green) light quantity, B (blue) light quantity, or C (clear) light quantity received from the light receiving unit 371 into a digital value.

According to various embodiments, the first block b1 for detecting flicker may include a buffer 375 (e.g., a first-in first-out (FIFO) buffer) capable of storing a digital value of some section among the digital values (e.g., digital raw data) converted into through the ADC 373 and a first communication interface 377 capable of transmitting the digital value (e.g., digital raw data) stored in the buffer 375 to the first processor 320.

According to an embodiment, the buffer 375 may include at least one storage length of a flicker period or longer. According to an embodiment, the first processor 320 may calculate the flicker frequency using at least part of the data stored in the buffer.

According to an embodiment, if the activation signal of the camera module is received from the first processor 320, the first block b1 for detecting flicker may be activated.

According to an embodiment, upon failing to receive the activation signal of the camera module from the first processor 320, the first block b1 for detecting flicker may be deactivated.

According to an embodiment, if the activation signal of the camera module is received from the first processor 320 so that the first block b1 for detecting flicker is activated, a digital value of some section among the digital values (e.g., data) received from the ADC 373 during a designated short period to detect the frequency of the light source having 100 Hz or 120 Hz may be stored in the buffer 375 (e.g., a first-in first-out (FIFO) buffer), and the data stored in the buffer may be transmitted to the first processor 320 to remove the flicker noise (or band noise) from the image obtained by the camera module.

According to an embodiment, the activation signal of the camera module may be received from the first processor 320 through the first communication interface 377.

According to an embodiment, the data stored in the buffer 375 may be transmitted to the first processor 320 through the first communication interface 377.

According to an embodiment, the first communication interface 377 enables transmission/reception of data and/or signals between the first processor 320 and the first block b1 using a digital communication scheme, such as an inter-integrated circuit (I2C), a serial peripheral interface (SPI), and/or a mobile industry processor interface (MIPI).

According to various embodiments, the second block b2 for detecting ambient light may include a second communication interface 379.

According to an embodiment, if the activation signal of the camera module is received from the first processor 320, the second block b2 for detecting ambient light may be deactivated.

According to an embodiment, upon failing to receive the activation signal of the camera module from the first processor 320, the second block b2 for detecting ambient light may be activated.

According to an embodiment, if the activation signal of the camera module is not received from the first processor 320 so that the second block b2 for detecting ambient light is activated, the digital value (e.g., data) received from the ADC 373 may be transmitted to the second processor 350 through the second communication interface 379.

According to an embodiment, the second communication interface 379 enables transmission/reception of data and/or signals between the second processor 350 and the second block b2 using a digital communication scheme, such as I2C, SPI, and/or MIPI.

Referring to FIG. 4, the second sensor 375 disposed on the front surface of the electronic device (e.g., the electronic device 101 of FIG. 1 and/or the electronic device 301 of FIG. 3) may include a light receiving unit 381, an ADC 383, and a third communication interface 385.

According to various embodiments, the second sensor 375 may be disposed at a lower end of one area of the display to overlap one area of the display on the front surface of the electronic device.

According to various embodiments, the light receiving unit 381 may include a 4×4 16 photodiode array. The analog electrical signal corresponding to each of the red (R) light quantity, green (G) light quantity, blue (B) light quantity, or clear (C) quantity of the light incident through the light receiving unit 381 may be transmitted to the ADC 373. R (red) light quantity, G (green) light quantity, B (blue) light quantity, or C (clear) light quantity may be the intensity of light received from the R channel, the G channel, the B channel, and the C channel, respectively.

According to an embodiment, the light receiving unit 381 may include a plurality of channels, e.g., an R channel, a G channel, a B channel, and a C channel, and may also include two channels (e.g., a C channel and an IR channel) capable of receiving visible light and IR-band light. The channels may include a plurality of light receiving elements capable of receiving light. For example, each of the R channel, the G channel, the B channel, and the C channel may include a plurality (e.g., four) photodiodes capable of receiving external light.

According to various embodiments, the ADC 383 may convert the analog electrical signal corresponding to each of the R (red) light quantity, G (green) light quantity, B (blue) light quantity, or C (clear) light quantity received from the light receiving unit 371 into a digital value.

According to various embodiments, the digit value (e.g., data) received from the ADC 383 may be transmitted to the second processor 350 through the third communication interface 377.

According to an embodiment, the third communication interface 377 enables transmission/reception of data and/or signals between the second processor 320 and the second sensor 375 using a digital communication scheme, such as I2C, SPI, and/or MIPI.

The data for removing the flicker noise (or band noise) from the image obtained by the camera module may be transmitted from the first sensor 370 to the first processor 320 and be processed by the first processor 320. Data for adjusting the brightness of the display may be transmitted to the second processor 350 (e.g., a sensor hub) capable of processing data with low power and be processed by the second processor 350. Thus, the electronic device may adjust the brightness of the display 360 based on the data received from each of the first sensor 370 and the second sensor 375, with less current consumption.

Figure 5A:
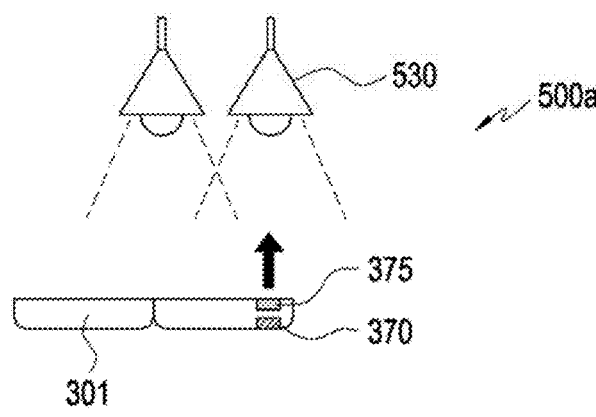
FIGS. 5A to 5C are views illustrating an operation of adjusting the brightness of a display according to a change in the position of an electronic device in the electronic device according to various embodiments.
Figure 5B:
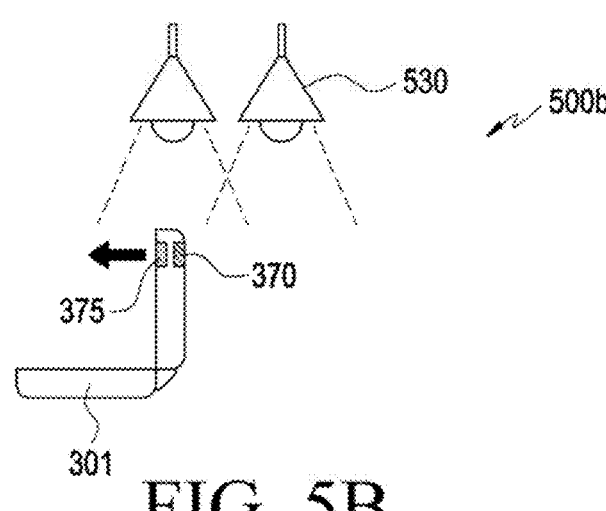
Figure 5C:
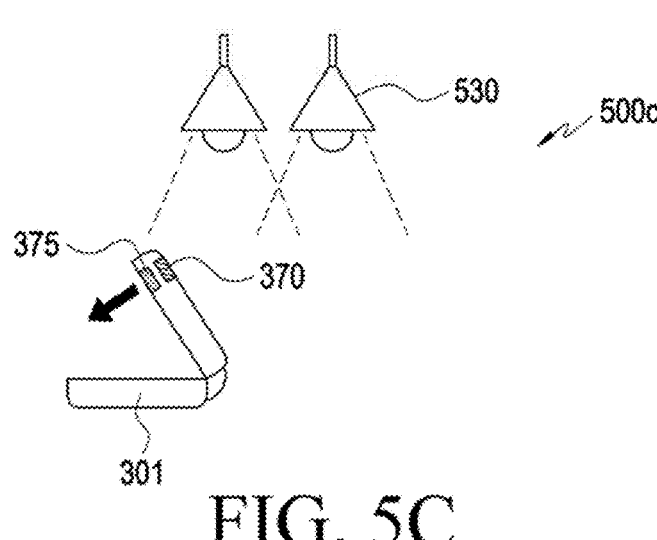

FIGS. 5A, 5B and 5C show example views 500a, 500b and 500c, respectively, illustrating an operation of adjusting the brightness of a display according to a change in the position of an electronic device in the electronic device according to various embodiments.

Referring to FIG. 5A, when the angle between the second sensor 375 (e.g., the second sensor 375 of FIGS. 3 and 4) disposed on the front surface of the electronic device 301 (e.g., the electronic device 101 of FIG. 1 and/or the electronic device 301 of FIG. 3) and the ambient light source 530 is 0 degrees (when the illuminance of the ambient light source is measured within the FOV of the second sensor 375) in a state in which the first block (e.g., b1 of FIG. 4) for detecting flicker included in the first sensor 370 (e.g., the first sensor 370 of FIGS. 3 and 4) is inactive, and the second block (e.g., b2 of FIG. 4) for detecting ambient light included in the first sensor 370 is active, upon receiving data (e.g., indicating 50 Lux) from the first sensor 370 and data (e.g., indicating 500 Lux) from the second sensor 375, the second processor (e.g., the second processor 350 of FIGS. 3 and 4) may adjust the brightness of the display based on the data (e.g., 500 Lux) received from the second sensor 375, rather than the data (e.g., 50 Lux) received from the first sensor 370.

Referring to FIG. 5B, when the angle between the second sensor 375 (e.g., the second sensor 375 of FIGS. 3 and 4) disposed on the front surface of the electronic device 301 (e.g., the electronic device 101 of FIG. 1 and/or the electronic device 301 of FIG. 3) and the ambient light source 530 is 90 degrees (when the illuminance of the ambient light source is not measured within the FOV of the second sensor 375) in a state in which the first block (e.g., b1 of FIG. 4) for detecting flicker included in the first sensor 370 (e.g., the first sensor 370 of FIGS. 3 and 4) is inactive, and the second block (e.g., b2 of FIG. 4) for detecting ambient light included in the first sensor 370 is active, upon receiving data (e.g., indicating 300 Lux) from the first sensor 370 and data (e.g., indicating 200 Lux) from the second sensor 375, the second processor (e.g., the second processor 350 of FIGS. 3 and 4) may adjust the brightness of the display based on the data (e.g., 300 Lux) received from the first sensor 370, rather than the data (e.g., 200 Lux) received from the second sensor 375.

Referring to FIG. 5C, when the angle between the second sensor 375 (e.g., the second sensor 375 of FIGS. 3 and 4) disposed on the front surface of the electronic device 301 (e.g., the electronic device 101 of FIG. 1 and/or the electronic device 301 of FIG. 3) and the ambient light source 530 is 135 degrees (when the ambient light source is not measured within the FOV of the second sensor 375) in a state in which the first block (e.g., b1 of FIG. 4) for detecting flicker included in the first sensor 370 (e.g., the first sensor 370 of FIGS. 3 and 4) is inactive, and the second block (e.g., b2 of FIG. 4) for detecting ambient light included in the first sensor 370 is active, upon receiving data (e.g., indicating 500 Lux) from the first sensor 370 and data (e.g., indicating 100 Lux) from the second sensor 375, the second processor (e.g., the second processor 350 of FIGS. 3 and 4) may adjust the brightness of the display based on the data (e.g., 500 Lux) received from the first sensor 370, rather than the data (e.g., 100 Lux) received from the second sensor 375.

According to various embodiments, an electronic device (e.g., the electronic device 301 of FIG. 3) may comprise a display (e.g., the display 360 of FIG. 3), a camera module (e.g., the camera module 380), a sensor module (e.g., the sensor module 390 of FIG. 4) including a first sensor (e.g., the first sensor 370 of FIG. 4) disposed on a rear surface of the electronic device and operated based on light and a second sensor (e.g., the second sensor 375 of FIG. 4) disposed on a front surface of the electronic device and operated based on light, and a processor including a first processor (e.g., the first processor 320 of FIG. 4) and a second processor (e.g., the second processor 350 of FIG. 3). The processor may be configured to adjust a brightness of the display based on data received from the first sensor and data received from the second sensor when the camera module is in an inactive state, and adjust the brightness of the display based and not based on data received from the first sensor on data received from the second sensor when the camera module is in an active state.

According to various embodiments, the first processor may is a main processor, and the second processor may include an auxiliary processor including a sensor hub.

According to various embodiments, the first sensor may include a light receiving unit (e.g., the light receiving unit 371 of FIG. 4), an ADC (e.g., the ADC 373 of FIG. 4), a first block (e.g., b1 of FIG. 4) for flicker detection, including a buffer (e.g., the buffer 375 of FIG. 4 or a first-in first-out (FIFO) buffer) for storing data of some section of data received from the ADC and a first communication interface (e.g., the first interface 377 of FIG. 4) for transmitting the data stored in the buffer to the first processor, and a second block (e.g., b2 of FIG. 4) for detecting ambient light, including a second communication interface (e.g., the second communication interface 379 of FIG. 4) for transmitting the data received from the ADC to the second processor.

According to various embodiments, if the first sensor does nor receive an activation signal of the camera module from the first processor, the first block (e.g., b1 of FIG. 4) of the first sensor is deactivated, and the second block (e.g., b2 of FIG. 4) of the first sensor is activated, so that the data received from the ADC may be configured to be transmitted to the second processor through the second communication interface.

According to various embodiments, if the first sensor receives an activation signal of the camera module from the first processor, the first block (e.g., b1 of FIG. 4) of the first sensor is activated, and the second block (e.g., b2 of FIG. 4) of the first sensor is deactivated, so that the data stored in the buffer may be configured to be transmitted to the first processor through the first communication interface.

According to various embodiments, the second sensor may include a light receiving unit (e.g., the light receiving unit 381 of FIG. 4), an ADC (e.g., the ADC 383 of FIG. 4), and a third communication interface (e.g., the third communication interface 385 of FIG. 4) for transmitting data received from the ADC to the second processor.

According to various embodiments, the second processor may be configured to compare the data received from the first sensor with the data received from the second sensor when the camera module is in the inactive state, and upon identifying that the data received from the first sensor has a larger raw value than the data received from the second sensor, adjust the brightness of the display using the data received from the first sensor.

According to various embodiments, the second processor may be configured to, upon identifying that the data received from the second sensor has a larger raw value than the data received from the first sensor, adjust the brightness of the display using the data received from the second sensor.

According to various embodiments, the second processor may be configured to detect a folding state of the electronic device, and upon identifying that a folding angle of the electronic device is equal to larger than a reference angle based on the folding state of the electronic device, transmit a signal capable of activating a second block (e.g., b2 of FIG. 4) for detecting ambient light included in the first sensor to the first sensor.

Figure 6:
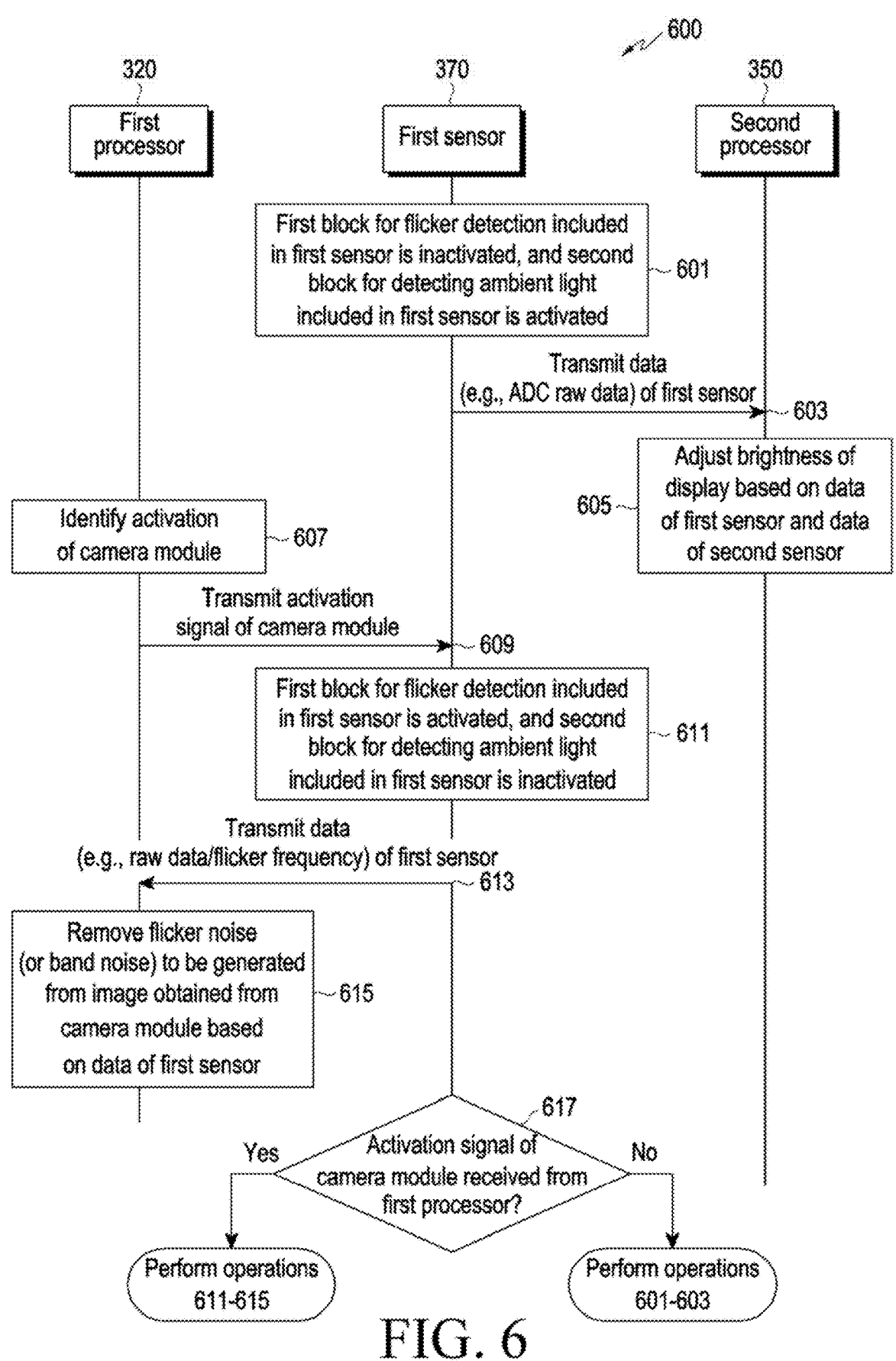
FIG. 6 is a flowchart illustrating operations of a first sensor of an electronic device according to various embodiments.

According to various embodiments, if the first sensor receives the signal capable of activating the second block of the first sensor from the second processor and does not receive an activation signal of the camera module from the first processor, a first block for flicker detection included in the first sensor is deactivated, and the second block included in the first sensor is activated, so that the data of the first sensor is configured to be transmitted to the second processor FIG. 6 is an example flowchart 600 illustrating operations of a first sensor of an electronic device according to various embodiments. The operations of the first sensor may include operations 601 to 617. According to an embodiment, at least one of operations 601 to 617 may be omitted or changed in order or may add other operations.

In operation 601, the first block (e.g., b1 of FIG. 4) for detecting flicker included in the first sensor 370 (e.g., the first sensor 370 of FIGS. 3 to 5) may be deactivated, and the second block (e.g., b2 of FIG. 4) for detecting ambient light included in the first sensor 370 (e.g., the first sensor 370 of FIGS. 3 to 5) may be activated.

According to an embodiment, the first block (e.g., b1 of FIG. 4) for detecting flicker included in the first sensor may be deactivated, and the second block (e.g., b2 of FIG. 4) for detecting ambient light may be activated.

In operation 603, the data (e.g., digital raw data) of the first sensor may be transmitted to the second processor (e.g., the second processor 350 of FIGS. 3 and 4) through the second block (e.g., b2 of FIG. 4) for detecting ambient light included in the first sensor 370.

According to an embodiment, as the second block (e.g., b2 of FIG. 4) is activated, the digital values (e.g., digital raw data) converted into through the ADC (e.g., the ADC 373 of FIG. 3) of the first sensor may be transmitted to the second processor 350 through the second communication interface 379 of the first sensor to adjust the brightness of the display.

In operation 605, the second processor 350 (e.g., the second processor 350 of FIGS. 3 and 4) may adjust the brightness of the display based on the data of the first sensor 370 and the data of the second sensor (e.g., the second sensor of FIGS. 3 and 4).

In operation 607, the first processor 320 (e.g., the first processor 320 of FIGS. 3 and 4) may identify the activation of the camera module.

According to an embodiment, the first processor may activate the camera module 380 by executing a camera application.

In operation 609, the first processor 320 (e.g., the first processor 320 of FIGS. 3 and 4) may transmit an activation signal of the camera module to the first sensor 370 (e.g., the first sensor 370 of FIGS. 3 to 5).

According to an embodiment, the first processor 320 may transmit, to the first sensor 370, an activation signal of the camera module for requesting data for removing the flicker noise (or band noise) from the image obtained by the camera module.

In operation 611, the first block (e.g., b1 of FIG. 4) for detecting flicker included in the first sensor 370 (e.g., the first sensor 370 of FIGS. 3 to 5) may be activated, and the second block (e.g., b2 of FIG. 4) for detecting ambient light included in the first sensor 370 (e.g., the first sensor 370 of FIGS. 3 to 5) may be deactivated.

According to an embodiment, the first block (e.g., b1 of FIG. 4) for detecting flicker included in the first sensor may be activated, and the second block (e.g., b2 of FIG. 4) for detecting ambient light may be deactivated based on the activation signal of the camera module received from the first processor 320.

In operation 613, the data (e.g., raw data or light source frequency) of the first sensor may be transmitted to the first processor (e.g., the first processor 320 of FIGS. 3 and 4) through the first block (e.g., b1 of FIG. 4) for detecting flicker included in the first sensor 370 (e.g., the first sensor 370 of FIGS. 3 to 5).

According to an embodiment, as the first block (e.g., b1 of FIG. 4) is activated, a digital value of some section among the digital values (e.g., digital raw data) converted into through the ADC (e.g., the ADC 373 of FIG. 3) of the first sensor may be stored in the buffer (e.g., the buffer 375 of FIG. 4 or a first-in first-out (FIFO) buffer) included in the first block (e.g., b1 of FIG. 4), and the data stored in the buffer may be transmitted to the first processor 320.

In operation 615, the first processor 320 (e.g., the first processor 320 of FIGS. 3 and 4) may remove the flicker noise (or band noise) from the image obtained by the camera module (e.g., the camera module 380 of FIG. 3) based on the data received from the first sensor 370 (e.g., the first sensor 370 of FIGS. 3 to 5).

According to an embodiment, the first processor 320 may detect the frequency of the light source having 100 Hz or 120 Hz based on the data received from the first sensor 370, removing the flicker noise (or band noise) from the image obtained by the camera module.

In operation 617, if the activation signal of the camera module is not received from the first processor 320 (e.g., the first processor 320 of FIGS. 3 and 4), the first block (e.g., b1 of FIG. 4) for detecting flicker included in the first sensor 370 (e.g., the first sensor 370 of FIGS. 3 to 5) may be deactivated, and the second block (e.g., b2 of FIG. 4) for detecting ambient light may be activated, performing operations 601 to 603 for transmitting the data (e.g., digital raw data) of the first sensor to the second processor (e.g., the second processor 350 of FIGS. 3 and 4) through the second block (e.g., b2 of FIG. 4) of the first sensor.

In operation 617, if the activation signal of the camera module is received from the first processor 320 (e.g., the first processor 320 of FIGS. 3 and 4), the first block (e.g., b1 of FIG. 4) for detecting flicker included in the first sensor 370 (e.g., the first sensor 370 of FIGS. 3 to 5) may be activated, and the second block (e.g., b2 of FIG. 4) for detecting ambient light may be deactivated, performing operations 611 to 613 for transmitting the data (e.g., digital raw data or light source frequency) of the first sensor to the first processor 320 (e.g., the first processor 320 of FIGS. 3 and 4) through the first block (e.g., b1 of FIG. 4) of the first sensor.

Figure 7A:
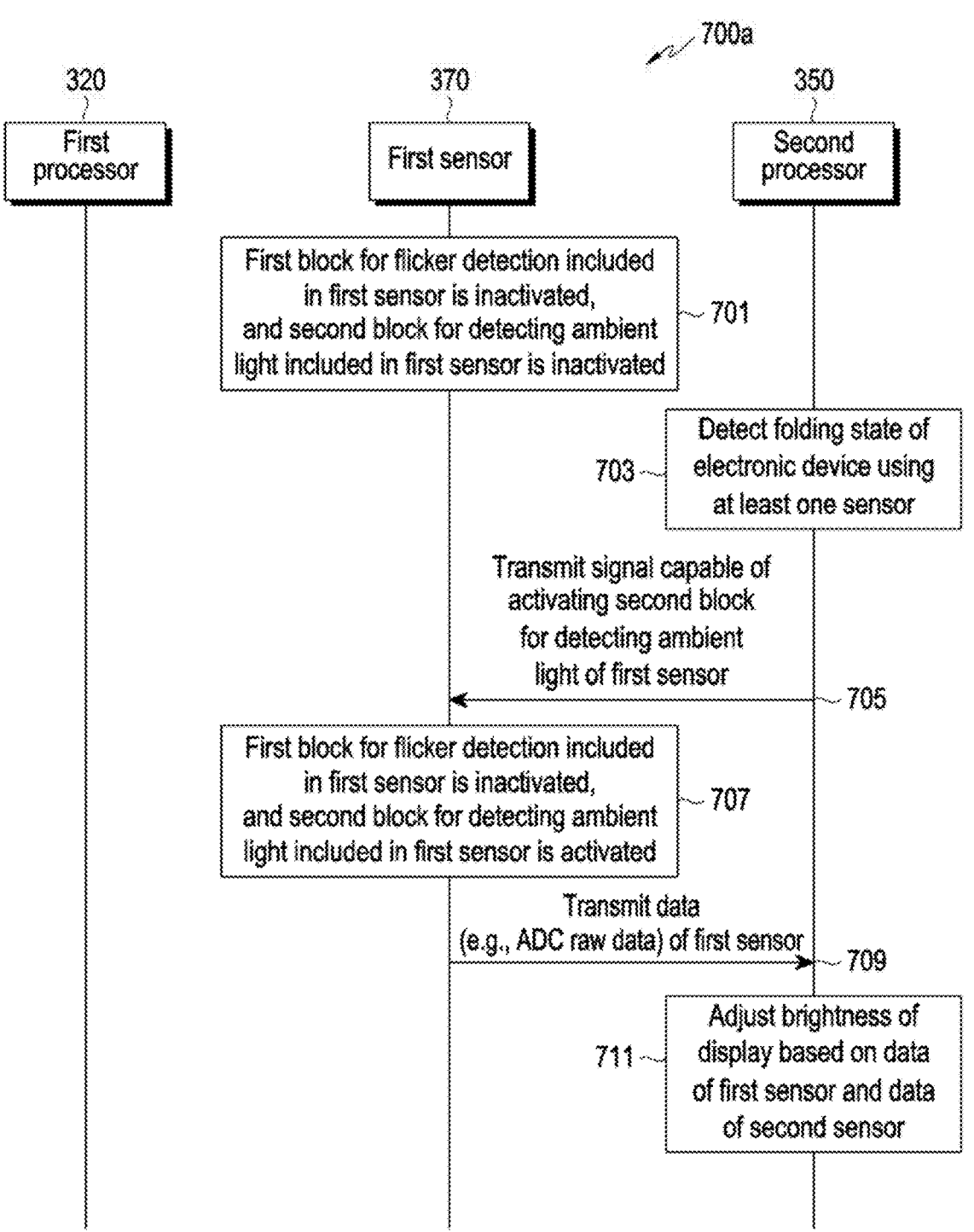
FIGS. 7A and 7B are flowcharts illustrating operations of a first sensor of an electronic device according to various embodiments.
Figure 7B:
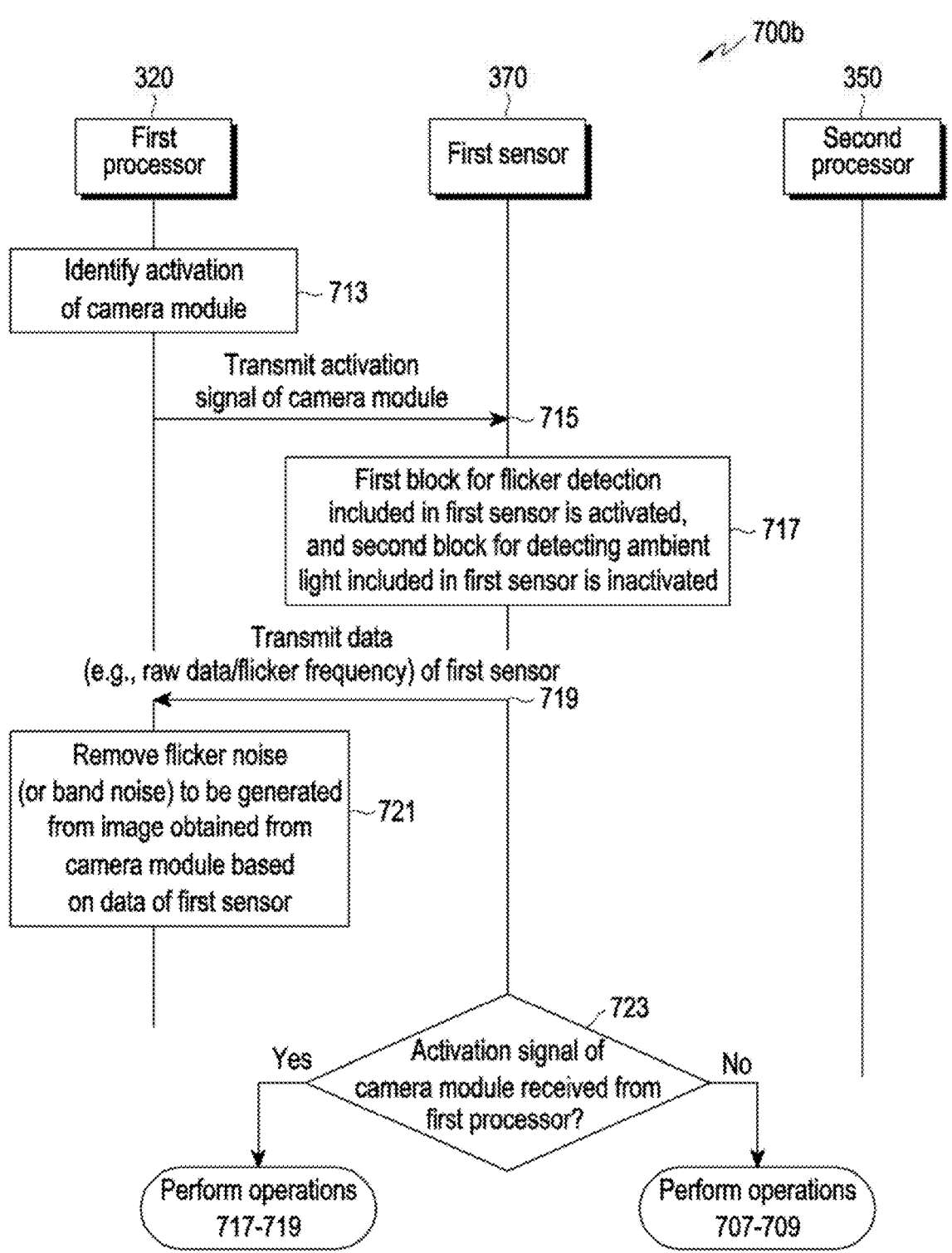

FIGS. 7A and 7B show example flowcharts 700*a* and 700*b*, respectively, illustrating operations of a first sensor of an electronic device according to various embodiments. The operations of the first sensor may include operations 701 to 723. According to an embodiment, at least one of operations 701 to 723 may be omitted or changed in order or may add other operations.

In operation 701, the first block (e.g., b1 of FIG. 4) for detecting flicker included in the first sensor 370 (e.g., the first sensor 370 of FIGS. 3 to 5) may be deactivated, and the second block (e.g., b2 of FIG. 4) for detecting ambient light included in the first sensor 370 (e.g., the first sensor 370 of FIGS. 3 to 5) may be deactivated.

According to an embodiment, the first block (e.g., b1 of FIG. 4) for detecting flicker included in the first sensor may be deactivated, and the second block (e.g., b2 of FIG. 4) for detecting ambient light may be deactivated.

In operation 703, the second processor 350 (e.g., the second processor 350 of FIGS. 3 and 4) may detect the folding state of the electronic device using at least one sensor (e.g., at least one third sensor among an angle sensor, a tilt sensor, or an accelerometer) capable of detecting the position of the electronic device among the sensors included in the sensor module (e.g., the sensor module 390 of FIG. 3).

According to an embodiment, the second processor 350 may identify that the position value of the electronic device is a reference position value or more using the at least one sensor capable of detecting the position of the electronic device.

According to an embodiment, the second processor 350 may identify that the folding angle of the electronic device is a reference angle or more using the at least one sensor capable of detecting the folding state of the electronic device.

In operation 705, the second processor 350 (e.g., the second processor 350 of FIGS. 3 and 4) may transmit, to the first sensor 370, a signal capable of activating the second block (e.g., b2 of FIG. 4) for detecting ambient light of the first sensor 370.

In operation 707, the first block (e.g., b1 of FIG. 4) for detecting flicker included in the first sensor 370 (e.g., the first sensor 370 of FIGS. 3 to 5) may be deactivated, and the second block (e.g., b2 of FIG. 4) for detecting ambient light included in the first sensor 370 (e.g., the first sensor 370 of FIGS. 3 to 5) may be activated.

According to an embodiment, the first sensor 370 may activate the second block (e.g., b2 of FIG. 4) for detecting ambient light according to the signal capable of activating the second block (e.g., b2 of FIG. 4) for detecting ambient light, received from the second processor 350.

In operation 709, the data (e.g., digital raw data) of the first sensor may be transmitted to the second processor (e.g., the second processor 350 of FIGS. 3 and 4) through the second block (e.g., b2 of FIG. 4) for detecting ambient light included in the first sensor 370.

According to an embodiment, as the second block (e.g., b2 of FIG. 4) is activated, the digital values (e.g., digital raw data) converted into through the ADC (e.g., the ADC 373 of FIG. 3) of the first sensor may be transmitted to the second processor 350 through the second communication interface 379 of the first sensor to adjust the brightness of the display.

In operation 711, the second processor 350 (e.g., the second processor 350 of FIGS. 3 and 4) may adjust the brightness of the display based on the data of the first sensor 370 and the data of the second sensor (e.g., the second sensor of FIGS. 3 and 4).

In operation 713, the first processor 320 (e.g., the first processor 320 of FIGS. 3 and 4) may identify the activation of the camera module.

According to an embodiment, the first processor may activate the camera module 380 by executing a camera application.

In operation 715, the first processor 320 (e.g., the first processor 320 of FIGS. 3 and 4) may transmit an activation signal of the camera module to the first sensor 370 (e.g., the first sensor 370 of FIGS. 3 to 5).

According to an embodiment, the first processor 320 may transmit, to the first sensor 370, an activation signal of the camera module for requesting data for removing the flicker noise (or band noise) from the image obtained by the camera module.

In operation 717, the first block (e.g., b1 of FIG. 4) for detecting flicker included in the first sensor 370 (e.g., the first sensor 370 of FIGS. 3 to 5) may be activated, and the second block (e.g., b2 of FIG. 4) for detecting ambient light included in the first sensor 370 (e.g., the first sensor 370 of FIGS. 3 to 5) may be deactivated.

According to an embodiment, the first block (e.g., b1 of FIG. 4) for detecting flicker included in the first sensor may be activated, and the second block (e.g., b2 of FIG. 4) for detecting ambient light may be deactivated based on the activation signal of the camera module received from the first processor 320.

In operation 719, the data (e.g., raw data or light source frequency) of the first sensor may be transmitted to the first processor (e.g., the first processor 320 of FIGS. 3 and 4) through the first block (e.g., b1 of FIG. 4) for detecting flicker included in the first sensor 370 (e.g., the first sensor 370 of FIGS. 3 to 5).

According to an embodiment, as the first block (e.g., b1 of FIG. 4) is activated, a digital value of some section among the digital values (e.g., digital raw data) converted into through the ADC (e.g., the ADC 373 of FIG. 3) of the first sensor may be stored in the buffer (e.g., the buffer 375 of FIG. 4 or a first-in first-out (FIFO) buffer) included in the first block (e.g., b1 of FIG. 4), and the data stored in the buffer may be transmitted to the first processor 320.

In operation 721, the first processor 320 (e.g., the first processor 320 of FIGS. 3 and 4) may remove the flicker noise (or band noise) from the image obtained by the camera module (e.g., the camera module 380 of FIG. 3) based on the data received from the first sensor 370 (e.g., the first sensor 370 of FIGS. 3 to 5).

According to an embodiment, the first processor 320 may detect the frequency of the light source having 100 Hz or 120 Hz based on the data received from the first sensor 370, removing the flicker noise (or band noise) from the image obtained by the camera module.

In operation 723, if the activation signal of the camera module is not received from the first processor 320 (e.g., the first processor 320 of FIGS. 3 and 4), the first block (e.g., b1 of FIG. 4) for detecting flicker included in the first sensor 370 (e.g., the first sensor 370 of FIGS. 3 to 5) may be deactivated, and the second block (e.g., b2 of FIG. 4) for detecting ambient light may be activated, performing operations 707 to 709 for transmitting the data (e.g., digital raw data) of the first sensor to the second processor (e.g., the second processor 350 of FIGS. 3 and 4) through the second block (e.g., b2 of FIG. 4) of the first sensor.

In operation 723, if the activation signal of the camera module is received from the first processor 320 (e.g., the first processor 320 of FIGS. 3 and 4), the first block (e.g., b1 of FIG. 4) for detecting flicker included in the first sensor 370 (e.g., the first sensor 370 of FIGS. 3 to 5) may be activated, and the second block (e.g., b2 of FIG. 4) for detecting ambient light may be deactivated, performing operations 717 to 719 for transmitting the data (e.g., digital raw data or light source frequency) of the first sensor to the first processor 320 (e.g., the first processor 320 of FIGS. 3 and 4) through the first block (e.g., b1 of FIG. 4) of the first sensor.

Figure 8:
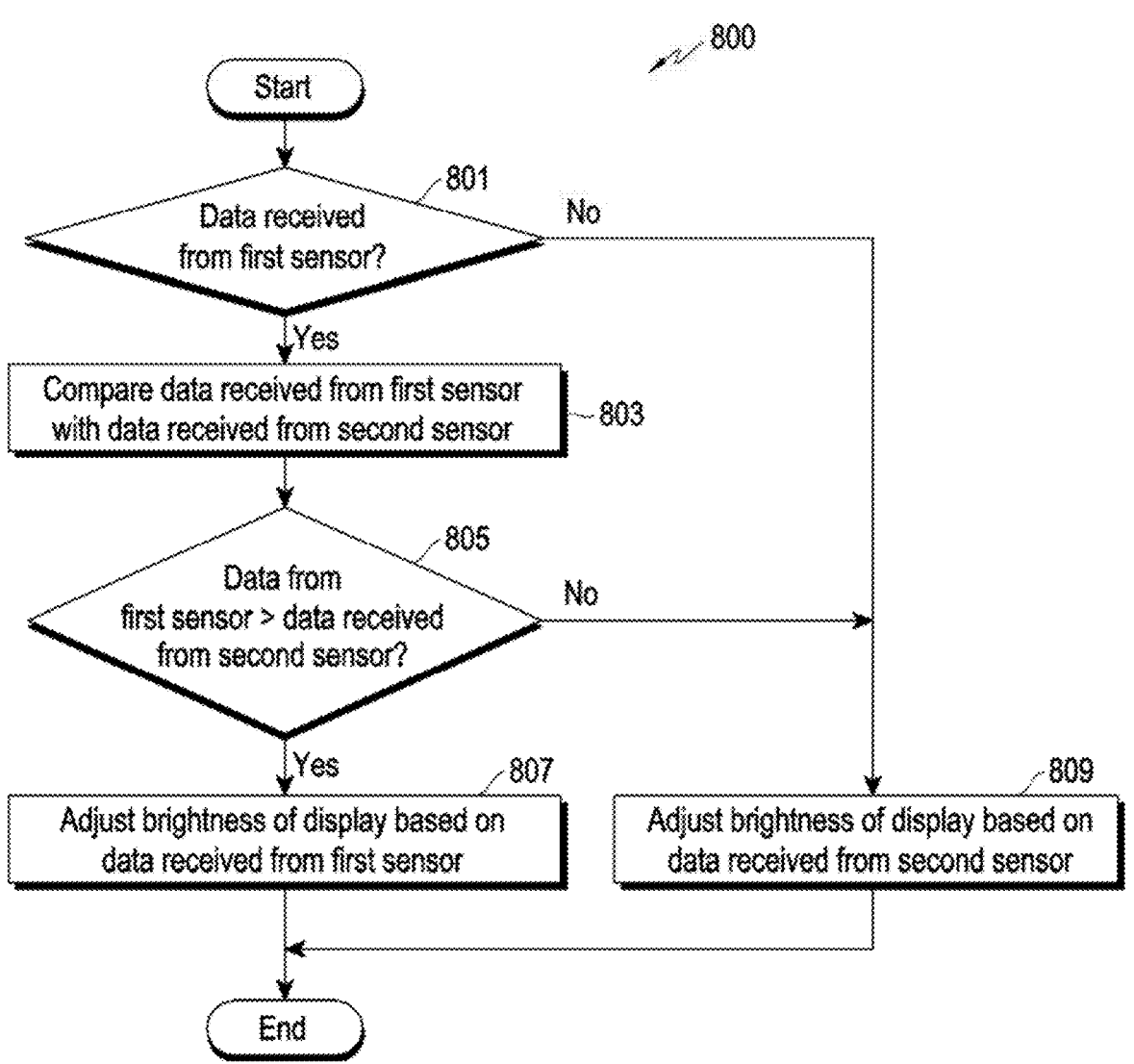
FIG. 8 is a flowchart illustrating an operation of adjusting the brightness of a display of an electronic device according to various embodiments.

FIG. 8 is an example flowchart 800 illustrating an operation of adjusting the brightness of a display of an electronic device according to various embodiments. The operations of adjusting the brightness of the display may include operations 801 to 809. According to an embodiment, at least one of operations 801 to 809 may be omitted or changed in order or may add other operations. The operations of adjusting the brightness of the display may be performed by the electronic device 101 of FIG. 1, the processor 120 of FIG. 1, the electronic device 301 of FIG. 3, or the processor of FIG. 3 (e.g., the first processor 320 and/or second processor 350 of FIG. 3).

In operation 801, the electronic device 301 (e.g., the second processor 350 of FIGS. 3 and 4) may identify whether data is received from the first sensor 370 (e.g., the first sensor 370 of FIGS. 3 to 5).

Upon failing to identify reception of data from the first sensor in operation 801, the electronic device 301 (e.g., the second processor 350 of FIGS. 3 and 4) may adjust the brightness of the display based on the data (e.g., illuminance value) received from the second sensor (e.g., the second sensor 375 of FIGS. 3 and 4) in operation 809.

Upon identifying reception of the data from the first sensor in operation 801, the electronic device 301 (e.g., the second processor 350 of FIGS. 3 and 4) may compare the data received from the first sensor with the data received from the second sensor (the second sensor 375 of FIGS. 3 and 4) in operation 803.

According to an embodiment, as the first block (e.g., b1 of FIG. 4) for detecting flicker included in the first sensor is deactivated, and the second block (e.g., b2 of FIG. 4) for detecting ambient light included in the first sensor is activated, the electronic device 301 may receive data, which may be used as illuminance data, through the second block (e.g., b2 of FIG. 4) included in the first sensor, in the first sensor (e.g., the first sensor 370 of FIGS. 3 and 4) that has not received the camera activation signal from the first processor (e.g., the first processor 320 of FIGS. 3 and 4).

According to an embodiment, the electronic device 301 may receive the data which may be used as illuminance data from the second sensor (e.g., the second sensor 375 of FIGS. 3 and 4).

Upon determining that the data (e.g., illuminance value) from the first sensor 370 (e.g., the first sensor 370 of FIGS. 3 to 5) has a larger raw value than the data (e.g., illuminance value) received from the second sensor (e.g., the second sensor 375 of FIGS. 3 and 4) in operation 805, the electronic device 301 (e.g., the second processor 350 of FIGS. 3 and 4) may adjust the brightness of the display based on the data (e.g., illuminance value) from the first sensor in operation 807.

Upon determining that the data (e.g., illuminance value) received from the second sensor (e.g., the second sensor 375 of FIGS. 3 and 4) has a larger raw value than the data (e.g., illuminance value) from the first sensor 370 (e.g., the first sensor 370 of FIGS. 3 to 5) in operation 805, the electronic device 301 (e.g., the second processor 350 of FIGS. 3 and 4) may adjust the brightness of the display based on the data (e.g., illuminance value) received from the second sensor in operation 809.

According to various embodiments, a method for adjusting a brightness of a display in an electronic device may comprise adjusting the brightness of the display of the electronic device, based on data received from a first sensor disposed on a rear surface of the electronic device and operated based on light and data received from a second sensor disposed on a front surface of the electronic device and operated based on light when a camera module of the electronic device is in an inactive state, by a processor of the electronic device and adjusting the brightness of the display based on data received from the second sensor and not based on data received from the first sensor when the camera module is in an active state.

According to various embodiments, the processor may include a first processor and a second processor. The first processor may indicate a main processor, and the second processor may include an auxiliary processor including a sensor hub.

According to various embodiments, the method may further comprise transmitting, to a second processor of the processor, data of the first sensor if a first block (e.g., b1 of FIG. 4) for flicker detection included in the first sensor is deactivated, and a second block (e.g., b2 of FIG. 4) for detecting ambient light included in the first sensor is activated, if the first sensor does not receive an activation signal of the camera module from the first processor of the processor.

According to various embodiments, the method may further comprise transmitting, to the second processor of the processor, data received from an ADC of the first sensor, through a second communication interface of the second block (e.g., b2 of FIG. 4) when the second block (e.g., b2 of FIG. 4) included in the first sensor is activated.

According to various embodiments, the method may further comprise transmitting, to a first processor of the processor, data of the first sensor if a first block (e.g., b1 of FIG. 4) for flicker detection included in the first sensor is activated, and a second block (e.g., b2 of FIG. 4) for detecting ambient light included in the first sensor is deactivated, if the first sensor receive an activation signal of the camera module from the first processor of the processor.

According to various embodiments, the method may further comprise transmitting data of some section of data of the first sensor stored in a buffer of the first block (e.g., b1 of FIG. 4) through a first communication interface of the first block (e.g., b1 of FIG. 4) to the first processor of the processor when the first block (e.g., b1 of FIG. 4) included in the first sensor is activated.

According to various embodiments, the method may further comprise comparing the data received from the first sensor with the data received from the second sensor when the camera module is in the inactive state and upon identifying that the data received from the first sensor has a larger raw value than the data received from the second sensor, adjusting the brightness of the display using the data received from the first sensor.

According to various embodiments, the method may further comprise, upon identifying that the data received from the second sensor has a larger raw value than the data received from the first sensor, adjusting the brightness of the display using the data received from the second sensor.

According to various embodiments, the method may further comprise detecting a folding state of the electronic device and, upon identifying that a folding angle of the electronic device equal to lager than a reference angle based on the folding state of the electronic device, transmitting a signal capable of activating a second block (e.g., b2 of FIG. 4) for detecting ambient light of the first sensor to the first sensor.

According to various embodiments, the method may further comprise transmitting, to a second processor of the processor, data received from an ADC of the first sensor through a second communication interface of the second block (e.g., b2 of FIG. 4) if a first block (e.g., b1 of FIG. 4) for flicker detection included in the first sensor is deactivated, and a second block (e.g., b2 of FIG. 4) for detecting ambient light included in the first sensor is activated, if the first sensor receive a signal capable of activating the second block (e.g., b2 of FIG. 4) of the first sensor from a second processor of the processor and does not receive an activation signal of a camera module from the first processor.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 301). For example, a processor (e.g., the processor 520) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a camera module;
a sensor module including a first sensor disposed on a rear surface of the electronic device and operated based on light and a second sensor disposed on a front surface of the electronic device and operated based on light;
plurality of processors including a first processor and a second processor; and
memory storing instructions that, when executed by the plurality of processors, individually and/or collectively, cause the electronic device to:
determine whether the camera module is in an active state or an inactive state,
adjust a brightness of the display based on data received from the first sensor and data received from the second sensor based on determining the camera module is in the inactive state, and
adjust the brightness of the display based on data received from the second sensor and not based on data received from the first sensor based on determining the camera module is in the active state.

2. The electronic device of claim 1, wherein the first processor is a main processor, and
wherein the second processor includes an auxiliary processor including a sensor hub.

3. The electronic device of claim 1, wherein the first sensor includes:
a light receiving unit;
an analog-to-digital converter, ADC;
a first block for flicker detection, including a buffer for storing data of some section of data received from the ADC and a first communication interface for transmitting the data stored in the buffer to the first processor; and
a second block for detecting ambient light, including a second communication interface for transmitting the data received from the ADC to the second processor.

4. The electronic device of claim 3, wherein when the first sensor does not receive an activation signal of the camera module from the first processor, the first block of the first sensor is deactivated and the second block of the first sensor is activated, so that the data received from the ADC is configured to be transmitted to the second processor through the second communication interface.

5. The electronic device of claim 3, wherein when the first sensor receives an activation signal of the camera module from the first processor, the first block of the first sensor is activated, and the second block of the first sensor is deactivated, so that the data stored in the buffer is configured to be transmitted to the first processor through the first communication interface.

6. The electronic device of claim 1, wherein the second sensor includes:
a light receiving unit;
an analog-to-digital converter, ADC; and a third communication interface for transmitting data received from the ADC to the second processor.

7. The electronic device of claim 1, wherein the instructions, when executed by the second processor, individually and/or collectively, cause the electronic device to:
compare the data received from the first sensor with the data received from the second sensor when the camera module is in the inactive state, and
upon identifying that the data received from the first sensor has a larger raw value than the data received from the second sensor, adjust the brightness of the display using the data received from the first sensor.

8. The electronic device of claim 7, wherein the instructions, when executed by the second processor, individually and/or collectively, cause the electronic device to, upon identifying that the data received from the second sensor has a larger raw value than the data received from the first sensor, adjust the brightness of the display using the data received from the second sensor.

9. The electronic device of claim 1, wherein the instructions, when executed by the second processor, individually and/or collectively, cause the electronic device to:
detect a folding state of the electronic device, and
upon identifying that a folding angle of the electronic device is equal to larger than a reference angle based on the folding state of the electronic device, transmit a signal capable of activating a second block for detecting ambient light included in the first sensor to the first sensor.

10. The electronic device of claim 9, wherein if when the first sensor receives the signal capable of activating the second block of the first sensor from the second processor and does not receive an activation signal of the camera module from the first processor, a first block for flicker detection included in the first sensor is deactivated, and the second block included in the first sensor is activated, so that the data of the first sensor is configured to be transmitted to the second processor.

11. A method for adjusting a brightness of a display in an electronic device, the method comprising:
determining whether a camera module of the electronic device is in an active state or an inactive state;
adjusting the brightness of the display of the electronic device, based on data received from a first sensor disposed on a rear surface of the electronic device and operated based on light and data received from a second sensor disposed on a front surface of the electronic device and operated based on light based on determining the camera module of the electronic device is in the inactive state, by a processor of the electronic device; and
adjusting the brightness of the display based on data received from the second sensor and not based on data received from the first sensor based on determining the camera module is in the active state.

12. The method of claim 11, further comprising transmitting, to a second processor of the processor, data of the first sensor while a first block for flicker detection included in the first sensor is deactivated and a second block for detecting ambient light included in the first sensor is activated, when the first sensor does not receive an activation signal of the camera module from a first processor of the processor.

13. The method of claim 11, further comprising transmitting, to a first processor of the processor, data of the first sensor while a first block for flicker detection included in the first sensor is activated and a second block for detecting ambient light included in the first sensor is deactivated, when the first sensor receives an activation signal of the camera module from the first processor of the processor.

14. The method of claim 11, further comprising:

comparing the data received from the first sensor with the data received from the second sensor when the camera module is in the inactive state;

upon identifying that the data received from the first sensor has a larger raw value than the data received from the second sensor, adjusting the brightness of the display using the data received from the first sensor; and upon identifying that the data received from the second sensor has a larger raw value than the data received from the first sensor, adjusting the brightness of the display using the data received from the second sensor.

15. The method of claim 11, further comprising:

detecting a folding state of the electronic device;

upon identifying that a folding angle of the electronic device is equal to or larger than a reference angle based on the folding state of the electronic device, transmitting a signal capable of activating a second block for detecting ambient light of the first sensor to the first sensor; and transmitting, to a second processor of the processor, data received from an analog-to-digital converter, ADC, of the first sensor through a second communication interface of the second block while a first block for flicker detection included in the first sensor is deactivated, and the second block for detecting ambient light included in the first sensor is activated, when the first sensor receives a signal capable of activating the second block of the first sensor from the second processor and does not receive an activation signal of the camera module from a first processor of the processor.

16. An electronic device comprising:

a display;

a camera module;

a sensor module including a first sensor disposed on a rear surface of the electronic device and operated based on light and a second sensor disposed on a front surface of the electronic device and operated based on light;

a plurality of processors including a first processor and a second processor; and memory storing instructions that, when executed by the plurality of processors, individually and/or collectively, cause the electronic device to:

adjust a brightness of the display based on data having a larger value among data received from the first sensor and data received from the second sensor when the camera module is in an inactive state, and adjust the brightness of the display based on data received from the second sensor and not based on data received from the first sensor when the camera module is in an active state.

\* \* \* \* \*